(12) United States Patent
Inami et al.

(10) Patent No.: US 10,220,748 B2
(45) Date of Patent: Mar. 5, 2019

(54) VEHICULAR INTERIOR PART

(71) Applicant: TOYOTA BOSHOKU KABUSHIKI KAISHA, Aichi-ken (JP)

(72) Inventors: Shin Inami, Aichi-ken (JP); Takanori Kato, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/677,761

(22) Filed: Aug. 15, 2017

(65) Prior Publication Data
US 2018/0065519 A1 Mar. 8, 2018

(30) Foreign Application Priority Data

Sep. 5, 2016 (JP) .................. 2016-172488

(51) Int. Cl.
*B60R 13/02* (2006.01)
*B60N 2/75* (2018.01)
*B60J 5/04* (2006.01)
*B60R 21/04* (2006.01)

(52) U.S. Cl.
CPC .............. *B60N 2/78* (2018.02); *B60J 5/0468* (2013.01); *B60N 2/793* (2018.02); *B60R 13/0206* (2013.01); *B60R 13/0243* (2013.01); *B60R 21/0428* (2013.01); *B60R 2013/0293* (2013.01)

(58) Field of Classification Search
CPC ........... B60N 2/08; B60N 2/793; B60J 5/0468

USPC .............................................. 296/153, 187.05
See application file for complete search history.

(56) References Cited

U.S. PATENT DOCUMENTS

| | | | | |
|---|---|---|---|---|
| 6,893,077 B1 * | 5/2005 | DeJongh | ............ | B60N 2/42709 296/187.05 |
| 7,240,957 B2 * | 7/2007 | Dry | ..................... | B60R 13/0243 29/91.1 |
| 7,503,621 B2 * | 3/2009 | Mani | ................... | B60R 21/0428 226/153 |
| 8,123,280 B2 * | 2/2012 | Hori | ........................ | B60N 2/78 296/153 |

FOREIGN PATENT DOCUMENTS

JP 2010-126050 6/2010

* cited by examiner

*Primary Examiner* — Joseph D. Pape
(74) *Attorney, Agent, or Firm* — Greenblum & Bernstein, P.L.C.

(57) ABSTRACT

A vehicular interior part includes an armrest extending in a vehicular front-rear direction, the armrest including a vehicular interior edge portion and a vehicular exterior edge portion, and an interior part component where the armrest is mounted from an upper side at at least the vehicular interior edge portion and the vehicular exterior edge portion. One of the vehicular interior edge portion and the vehicular exterior edge portion is mounted on the interior part component so as to be removed from the interior part component relatively more easily than another one of the vehicular interior edge portion and the vehicular exterior edge portion.

7 Claims, 9 Drawing Sheets

2

VEHICULAR INTERIOR PART

CROSS REFERENCE TO RELATED APPLICATION

This application claims priority from Japanese Patent Application No. 2016-172488 filed on Sep. 5, 2016. The entire contents of the priority application are incorporated herein by reference.

FIELD OF THE INVENTION

The present disclosure relates to a vehicular interior part.

BACKGROUND OF THE INVENTION

A vehicular interior part including an armrest has been known. According to the disclosure, the armrest included in the vehicular interior part includes stopper projections on a rear surface thereof on a vehicular interior side and a vehicular exterior side. The armrest is mounted on an armrest support member of a trim body to close an armrest mounting hole formed in the armrest support member.

More specifically, the armrest support member includes an angled plate having a V-shaped angled portion in the armrest mounting hole and below the armrest that is mounted in the armrest mounting hole that is a correct position. The stopper projections on the rear surface of the armrest are stopped by a hole edge of the armrest mounting hole or fit in stopper holes in the angled plate such that the armrest is fixed. With such a configuration, the angled plate will be bent and deformed in case of a side collision, and the fixed armrest will be jumped up by the bent portion and released from the armrest mounting hole. Accordingly, the armrest support member is configured to absorb impact load.

According to such a configuration, the armrest support member having the armrest mounting hole can absorb the impact load effectively. However, the armrest is mounted in the armrest support member by fixing with only the stopper projections and therefore, all the stopper projections will be released from the hole edge or the stopper holes when receiving impact in case of a side collision. According to the releasing of the stopper projections, the armrest is completely separated from the armrest mounting hole and may fly within a vehicle and hit an occupant of a vehicle.

SUMMARY OF THE INVENTION

An objective of the present technology is to provide a vehicular interior part that can protect occupants of a vehicle surely in case of a side collision.

According to the present technology, a vehicular interior part includes an armrest extending in a vehicular front-rear direction, the armrest including a vehicular interior edge portion and a vehicular exterior edge portion, and an interior part component where the armrest is mounted from an upper side at at least the vehicular interior edge portion and the vehicular exterior edge portion. One of the vehicular interior edge portion and the vehicular exterior edge portion is mounted on the interior part component so as to be removed from the interior part component relatively more easily than another one of the vehicular interior edge portion and the vehicular exterior edge portion.

DETAILED DESCRIPTION OF EMBODIMENTS

One embodiment of the present technology will be described with reference to FIGS. 1 to 9. A vehicular front side is represented by "F" and a vehicular rear side is represented by "R" in FIGS. 1 to 3, and a left side is a vehicular interior side and a right side is a vehicular exterior side in FIGS. 4, 5, and 7-9.

Figure 1:
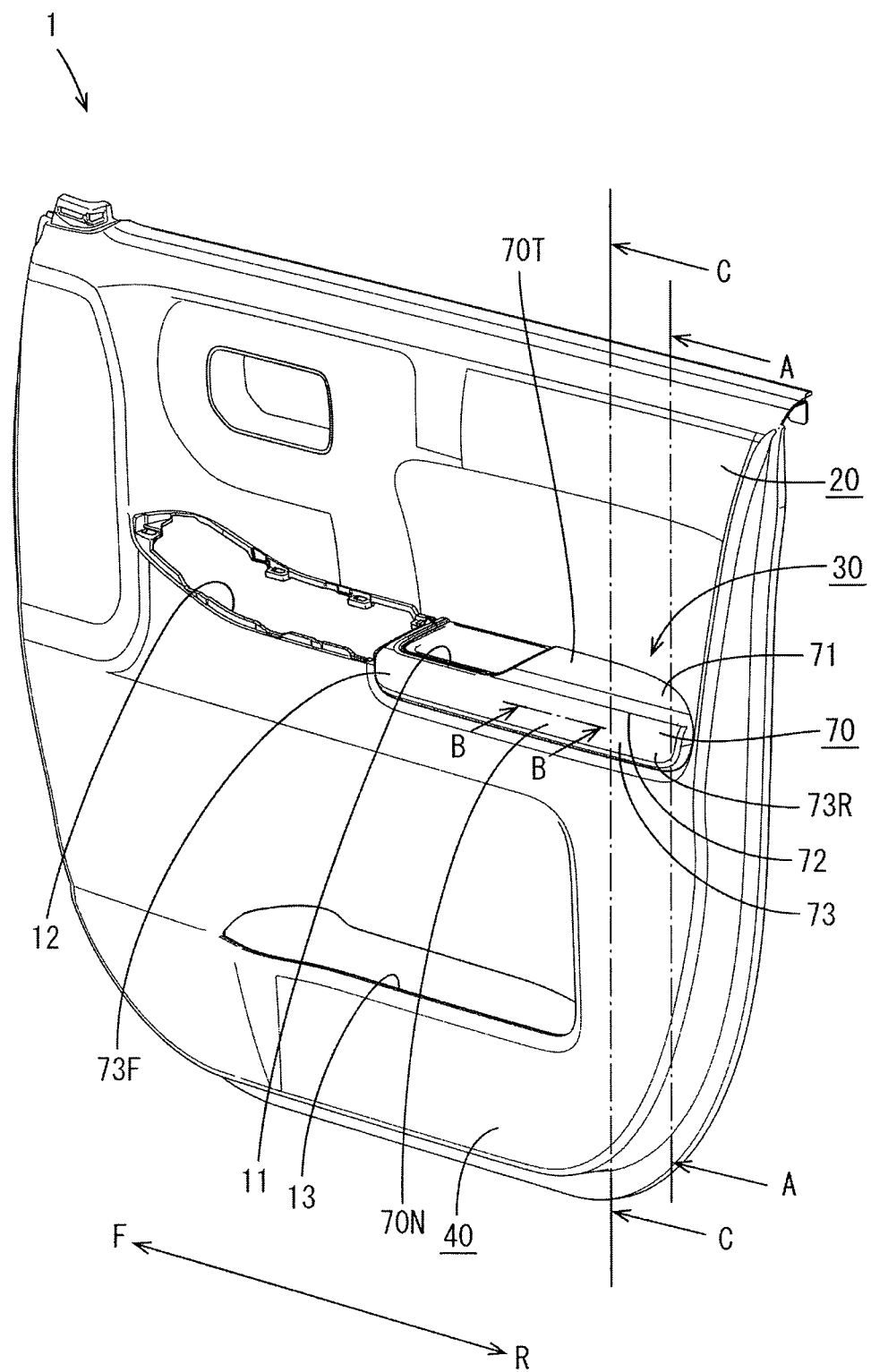
FIG. 1 is a perspective view of a vehicular interior part seen from a vehicular interior side.

As illustrated in FIG. 1, a vehicular door trim 1 (a vehicular interior part, referred to as a door trim 1 hereinafter) includes an upper board 20 forming an upper part and a lower board 40 forming a lower part. The upper board 20 and the lower board 40 are connected to each other and form a plate-like member. The upper board 20 and the lower board 40 are interior part components that form a vehicular interior side surface and extend in a vehicular front-rear direction. In the present embodiment, the door trim 1 includes a main portion that is formed by two board members of the upper board 20 and the lower board 40. The board members may include one board member or three or more board members.

The door trim 1 includes an armrest portion 30 in a substantially middle portion thereof with respect to a vertical direction so as to project toward the vehicular interior side. The armrest portion 30 includes an armrest 70 mounted in an armrest mounting hole 60 that is formed between a lower edge portion 22 of the upper board 20 and an upper edge portion 41 of the lower board 40 and through in the vertical direction. The armrest 70, which is a separate component, is mounted in the armrest mounting hole 60 from the upper side. The armrest mounting hole 60 defined by the lower edge portion 22 of the upper board 20 and the upper edge portion 41 of the lower board 40, which are the interior part components, is also the interior part component.

Figure 7:
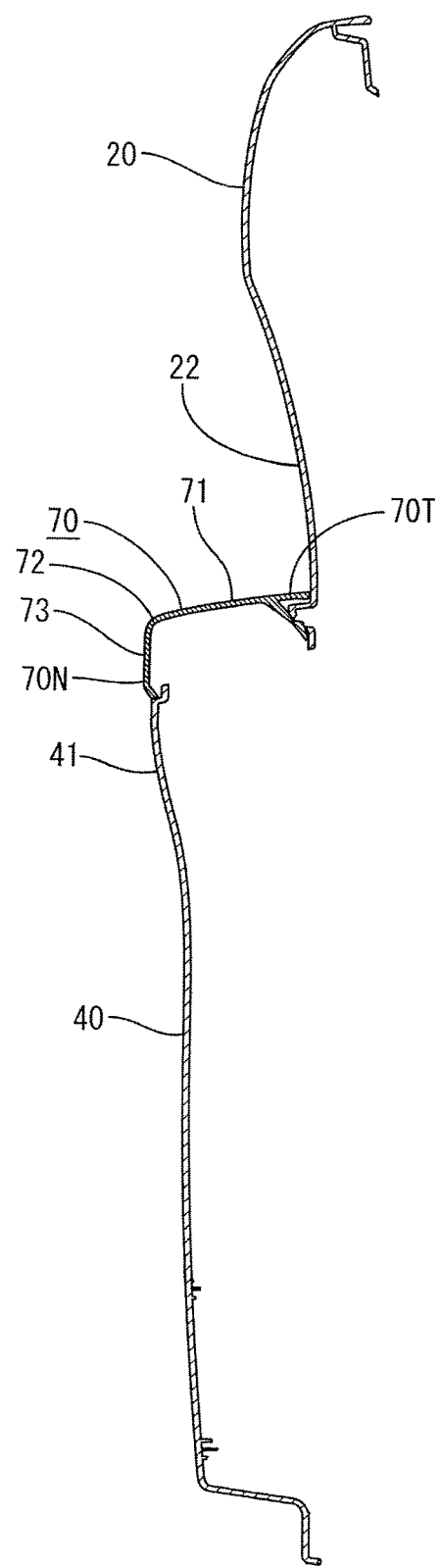
FIG. 7 is a cross-sectional view of a door trim taken along line C-C in FIGS. 1 and 2.

The armrest 70 extends in the vehicular front-rear direction similarly to the upper board 20 and the lower board 40. As illustrated in FIG. 7, the armrest 70 includes an upper surface portion 71 and a vehicular interior side surface portion 73. The upper surface portion 71 extends horizontally and an occupant of a vehicle can put his/her arm on the upper surface portion 71. The upper surface portion 71 has a vehicular interior side edge 72 and the vehicular interior side surface portion 73 extends downward from the vehicular interior side edge 72 and forms the vehicular interior side surface.

The armrest 70 includes a pull handle 11 in a vehicular front portion thereof. The pull handle 11 is open upwardly such that an occupant puts his/her hand therein to open and close a vehicular door from the vehicular interior side. The door trim 1 includes a switch base mounting hole 12 on the vehicular front side with respect to the armrest 70. A switch base is mounted in the switch base mounting hole 12. The door trim 1 further includes a door pocket 13 below the armrest 70 and the switch base mounting hole 12.

The armrest 70 is mounted on a hole edge 62 of the armrest mounting hole 60 at several portions. The armrest 70 includes a vehicular interior edge portion 70N and a vehicular exterior edge portion 70T and the hole edge 62 includes a vehicular interior hole edge portion 62N and a vehicular exterior hole edge portion 62T. Specifically, the armrest 70 is mounted on the hole edge 62 such that the vehicular interior edge portion 70N is fit to the vehicular interior hole edge portion 62N and the vehicular exterior edge portion 70T is fit to the vehicular exterior hole edge portion 62T. The vehicular interior side surface portion 73 includes a vehicular front side edge portion 73F and a vehicular rear side edge portion 73R.

The vehicular interior edge portion 70N is fixed to the hole edge 62 at two portions of the vehicular front side edge portion 73F and the vehicular rear side edge portion 73R with screws. Namely, the armrest 70 is mounted in the armrest mounting hole 60 with an irreversible way such that the armrest 70 and the hole edge 62 cannot return to an original state (before fastening with the screws 80) without using tools during vehicle's running. The vehicular interior edge portion 70N of the armrest 70 cannot be removed from the hole edge 62 without using tools during a vehicle's running. For example, the armrest 70 is mounted in the armrest mounting hole 60 such that the vehicular front side edge portion 73F and the vehicular rear side edge portion 73R of the armrest 70 is not released from the hole edge 62 even if an external force is applied on the door trim 1.

Figure 3:
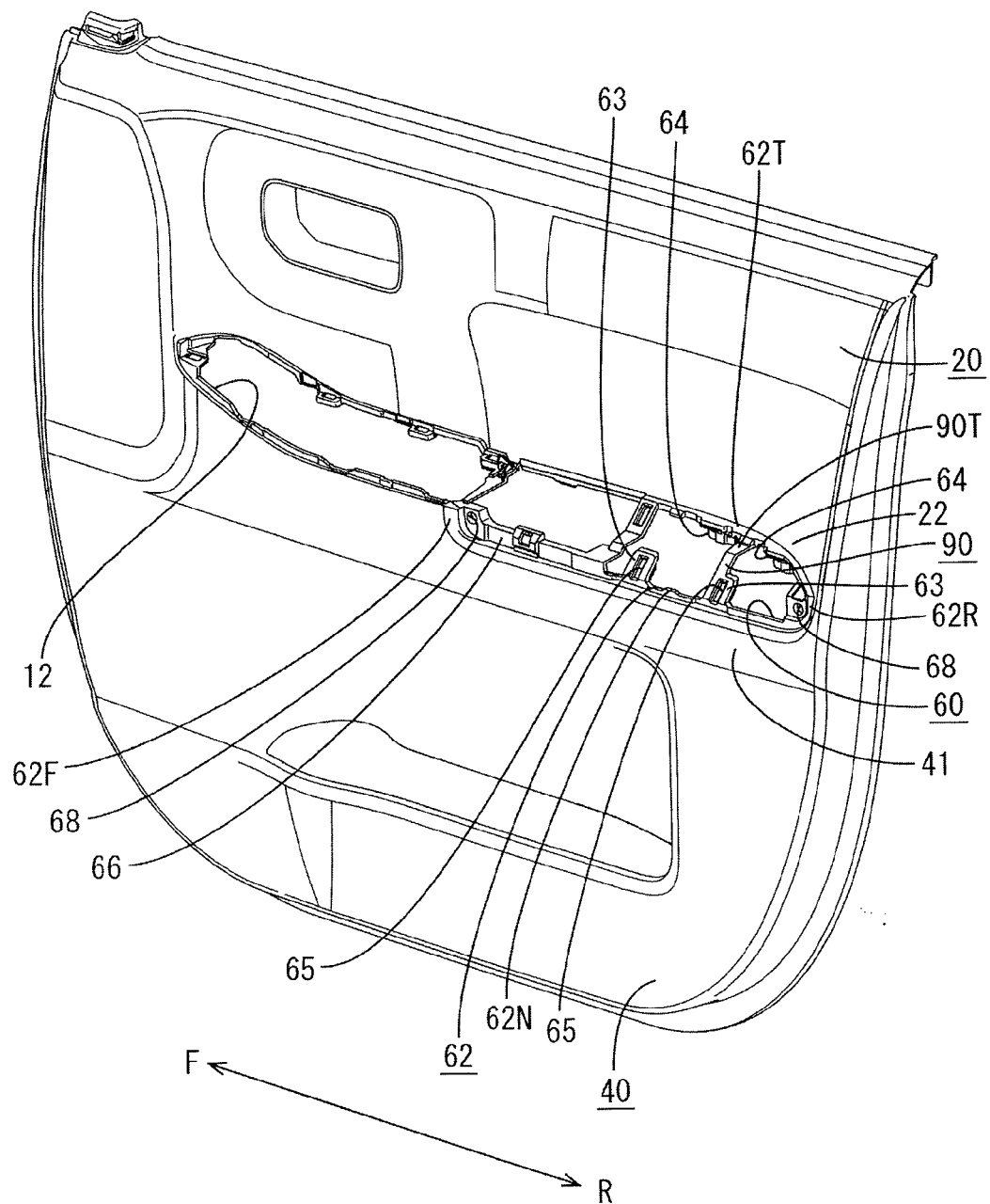
FIG. 3 is a perspective view of the vehicular interior part in FIG. 1 before mounting of the armrest.
Figure 4:
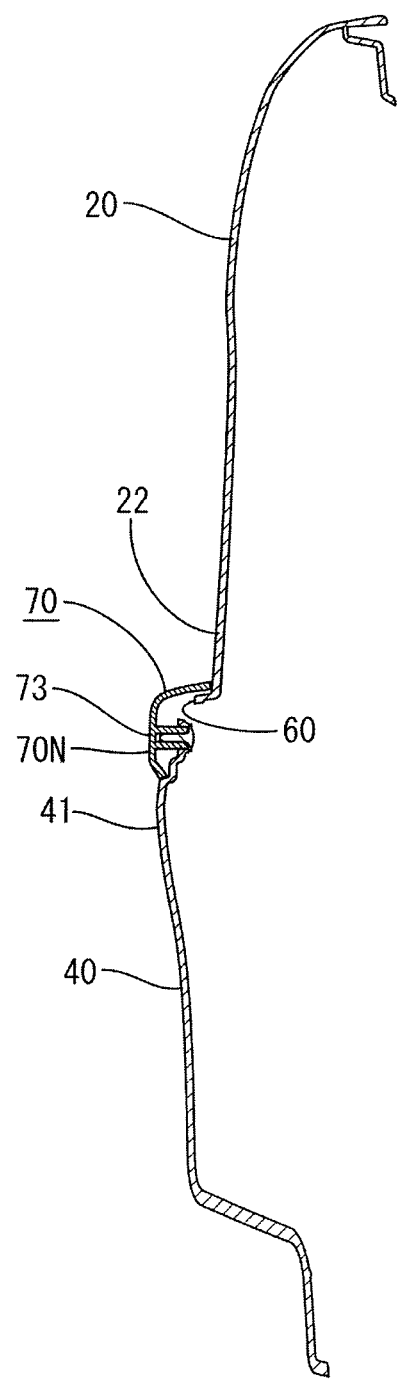
FIG. 4 is a cross-sectional view taken along line A-A in FIGS. 1 and 2.

As illustrated in FIG. 3, the vehicular interior side hole edge portion 62N of the armrest mounting hole 60 has boss insertion holes 68 in a vehicular front edge portion 62F and a vehicular rear edge portion 62R thereof, respectively. The boss insertion holes 68 are through the vehicular interior side hole edge portion 62N in a vehicular interior-exterior direction. The armrest 70 includes bosses 78 on a rear surface thereof and the bosses 78 are inserted through the boss insertion holes 68, respectively. As illustrated in FIG. 3, the lower board 40 includes a flange portion 66 that extends upward from the vehicular interior side hole edge portion 62N. The boss insertion holes 68 are formed in the flange portion 66.

Figure 5:
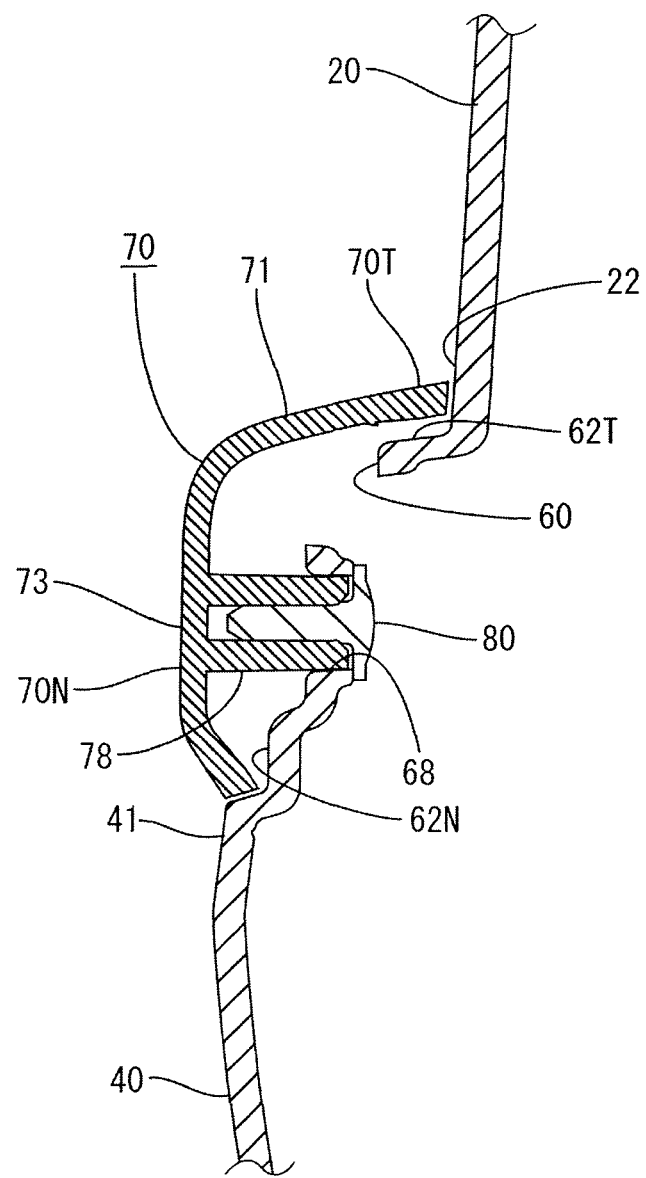
FIG. 5 is a cross-sectional view illustrating a screw fastening portion in FIG. 4.

As illustrated in FIG. 5, the armrest 70 includes the bosses 78 on a back surface of the vehicular interior side surface portion 73. The bosses 78 project from the back surface of the vehicular interior side surface portion 73 in a portion near the vehicular interior edge portion 70N to correspond to the respective boss insertion holes 68. The vehicular rear side edge portion 73R of the vehicular interior side surface portion 73 is illustrated in FIG. 5. The bosses 78 are inserted through the respective boss insertion holes 68 from the vehicular interior side and screws 80 are inserted in the respective bosses 78 from the vehicular exterior side. Accordingly, the vehicular interior edge portion 70N of the armrest 70 is fixed to the vehicular interior side hole edge portion 62N.

Figure 2:
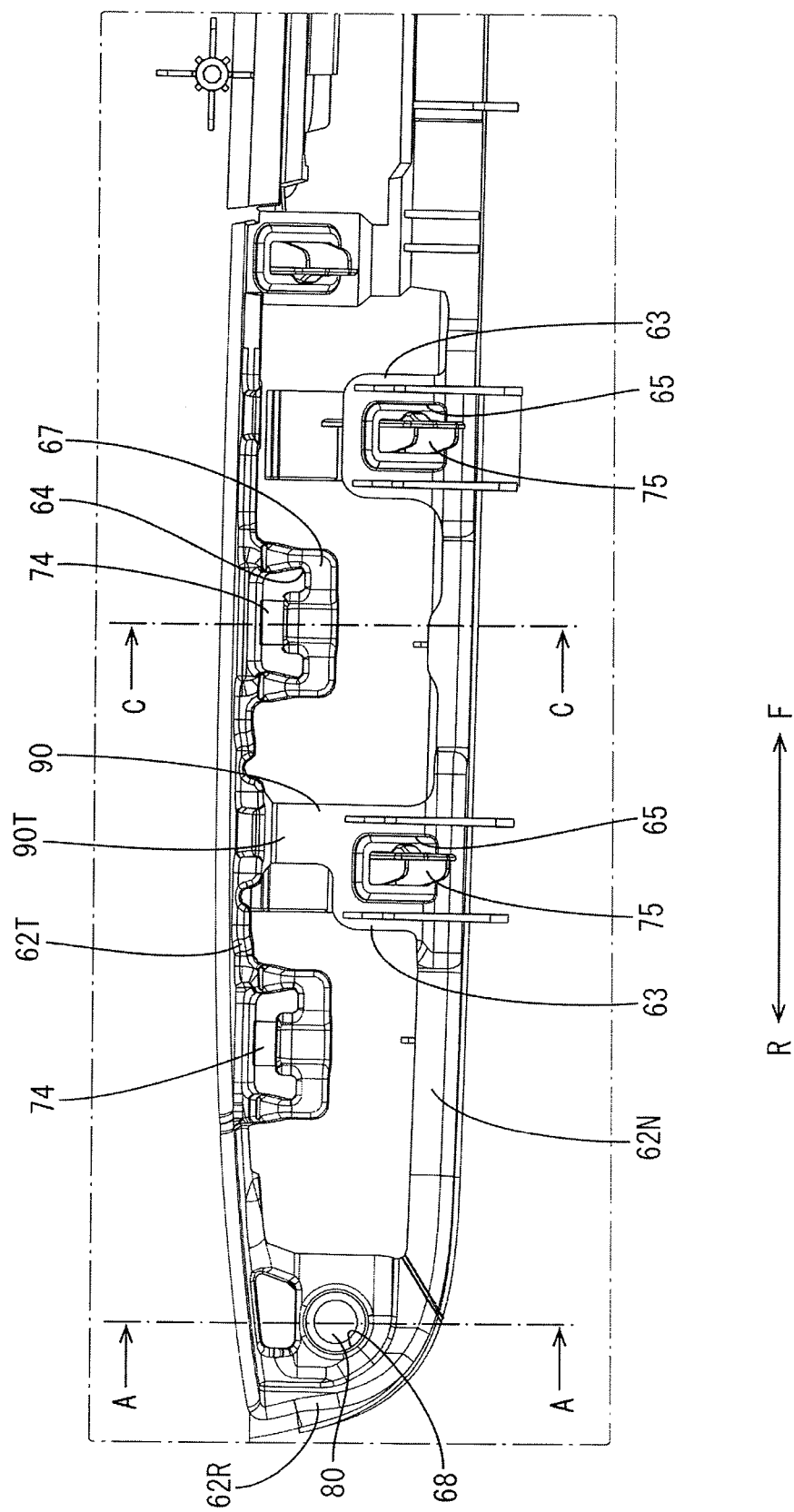
FIG. 2 is an enlarged side view of a part of an armrest portion (a vehicular rear side portion) of FIG. 1 seen from a vehicular exterior side.
Figure 6:
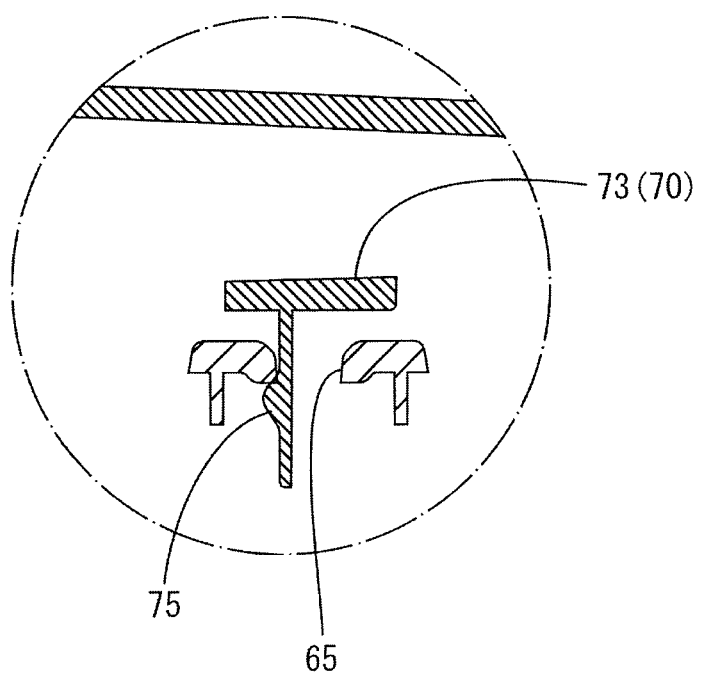
FIG. 6 is a cross-sectional view of an armrest taken along line B-B in FIG. 1 illustrating an intermediate stopper projection that is in an intermediate stopper hole.

As illustrated in FIGS. 2 and 3, the vehicular interior side hole edge portion 62N of the armrest mounting hole 60 includes intermediate stopper portions 63 between the vehicular front edge portion 62F and the vehicular rear edge portion 62R (on a rear side with respect to the vehicular front edge portion 62F and a front side with respect to the vehicular rear edge portion 62R). The intermediate stopper portions 63 extend from the vehicular interior side hole edge portion 62N toward the vehicular exterior hole edge portion 62T (toward a vehicular exterior upper side) and are inclined surfaces. Intermediate stopper holes 65 are formed in the intermediate stopper portions 63, respectively. As illustrated in FIG. 2, the armrest 70 includes intermediate stopper projections 75 on a back surface thereof. As illustrated in FIG. 6, the intermediate stopper projections 75 are inserted in the intermediate stopper holes 65, respectively. The intermediate stopper holes 65 are formed through the inclined surfaces, which are the intermediate stopper portions 63, from a vehicular interior upper side to a vehicular exterior lower side.

The intermediate stopper projections 75 are fit in the intermediate stopper holes 65, respectively. This helps fixing of the vehicular interior edge portion 70N of the armrest 70 to the vehicular interior side hole edge portion 62N. The intermediate stopper projections 75 are fit in the intermediate stopper holes 65 with a reversible way such that the armrest 70 and the hole edge 62 can return to an original state (before the intermediate stopper portions 75 are fit in the respective intermediate stopper holes 65) without using tools during vehicle's running. The intermediate stopper projections 75 can be removed from the intermediate stopper holes 65 without using tools during a vehicle's running. For example, the armrest 70 is mounted in the armrest mounting hole 60 such that the intermediate stopper projections 75 can be released from the intermediate stopper holes 65 if an external force is applied on the door trim 1.

Figure 8:
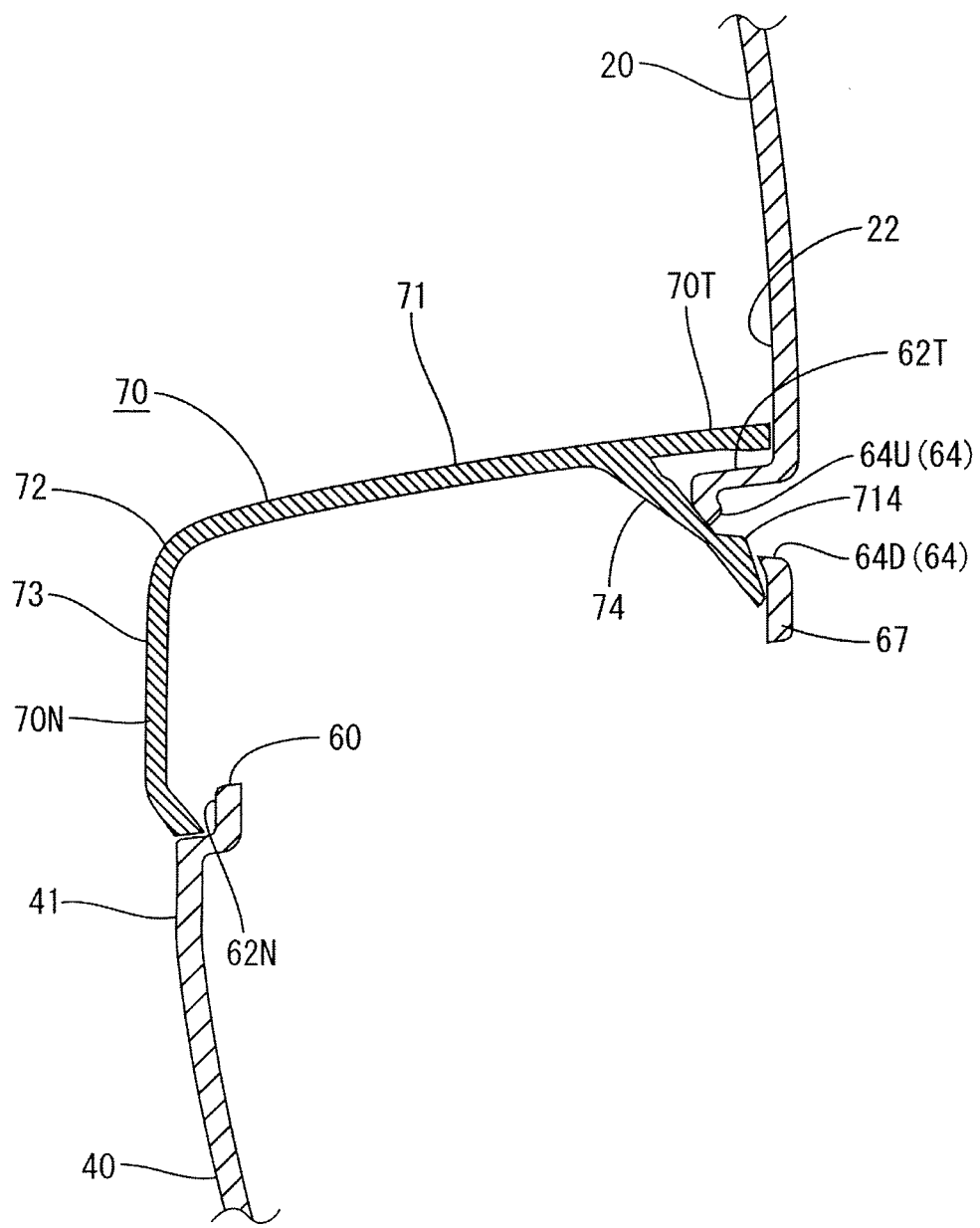
FIG. 8 is a cross-sectional view illustrating a part of exterior stopper projection fixing in FIG. 7.

As illustrated in FIG. 2, the vehicular exterior hole edge portion 62T of the armrest mounting hole 60 includes exterior stopper portions 67 in portions other than a front portion including the pull handle 11. As illustrated in FIGS. 2 and 8, the exterior stopper portions 67 projects downward from the vehicular exterior hole edge portion 62T and have exterior stopper holes 64, respectively. Exterior stopper projections 74 formed on the back surface of the armrest 70 are inserted and stopped in the exterior stopper holes 64, respectively. As illustrated in FIG. 8, the exterior stopper projections 74 project downward and toward the vehicular exterior side from the back surface of the upper surface portion 71 of the armrest 70 near the vehicular exterior edge portion 70T in a state that the armrest is mounted in the armrest mounting hole.

Each of the exterior stopper portions 67 has an inclined surface where the exterior stopper hole 64 is formed. As illustrated in FIG. 8, the exterior stopper holes 64 are through the exterior stopper portions 67 from a vehicular interior lower side to a vehicular exterior upper side. Namely, the exterior stopper hole 64 has an upper hole edge 64U and a lower hole edge 64D and the upper hole edge 64U is on the vehicular interior side than the lower hole edge 64D. The exterior stopper projections 74 are fit in the external stopper holes 64, respectively, from the vehicular interior upper side. Each of the exterior stopper projections 74 has a stopper portion 714 at a distal end portion thereof. The stopper portion 714 is stopped by the upper hole edge 64U from the vehicular exterior side such that the vehicular exterior edge portion 70T of the armrest 70 is fixed to the vehicular exterior hole edge portion 62T. The external stopper projections 74 are mounted in the external stopper holes 64 in the reversible way such that the armrest 70 and the hole edge 62 can return to an original state (before the external stopper projections 74 are fit in the respective external stopper holes 64) without using tools during vehicle's running. For example, the armrest 70 is mounted in the armrest mounting hole 60 such that the external stopper projections 74 can be removed from the external stopper holes 64 if an external force is applied on the door trim 1.

Accordingly, the vehicular exterior edge portion 70T of the armrest 70 is mounted on the hole edge 62 with the external stopper projections 74 to be releasable from the hole edge 62 without using any tools (in the reversible way). The vehicular interior edge portion 70N is mounted on the hole edge 62 with the screws 80 not to be releasable from the hole edge 62 without using any tools (in the irreversible way). That is, the vehicular interior edge portion 70N is fixed to the hole edge 62. Therefore, the armrest 70 is mounted in the armrest mounting hole 60 such that the vehicular exterior edge portion 70T (one portion) is releasable from the armrest mounting hole more easily compared to the vehicular interior edge portion 70N (another portion).

As illustrated in FIG. 3, a bridge portion 90 extends between the vehicular interior hole edge portion 62N and the vehicular exterior hole edge portion 62T of the hole edge 62 of the armrest mounting hole 60. The bridge portion 90 extends from one of the intermediate stopper portions 63 (a vehicular rear side one) and the bridge portion 90 is integrally formed with the intermediate stopper portion 63. Impact applied on the vehicular interior hole edge portion 62N is transferred to the vehicular exterior hole edge portion 62T via the bridge portion 90. Further, the bridge portion 90 receives a load applied from the upper side on the upper surface portion 71 of the armrest 70 that is mounted in the armrest mounting hole 60. The external stopper holes 64 are formed near a vehicular external side edge portion 90T of the bridge portion 90. The vehicular exterior edge portion 70T of the armrest 70 is fit on the vehicular exterior hole edge portion 62T near the bridge portion 90.

An operation of the armrest 71 in case of a side collision of a vehicle will be described. In case of a side collision, an occupant's hip first hits the lower board 40 that is below the armrest 70. Then, an impact load may be applied on the upper edge portion 41 and eventually, the impact load may be applied on the vehicular interior hole edge portion 62N of the armrest mounting hole 60. The impact on the vehicular interior hole edge portion 62N is transferred to the vehicular exterior hole edge portion 62T through the bridge portion 90. Then, the vehicular exterior hole edge portion 62T and a portion of the upper board 20 near the lower edge portion 22 may be warped or deformed toward the vehicular exterior side.

Figure 9:
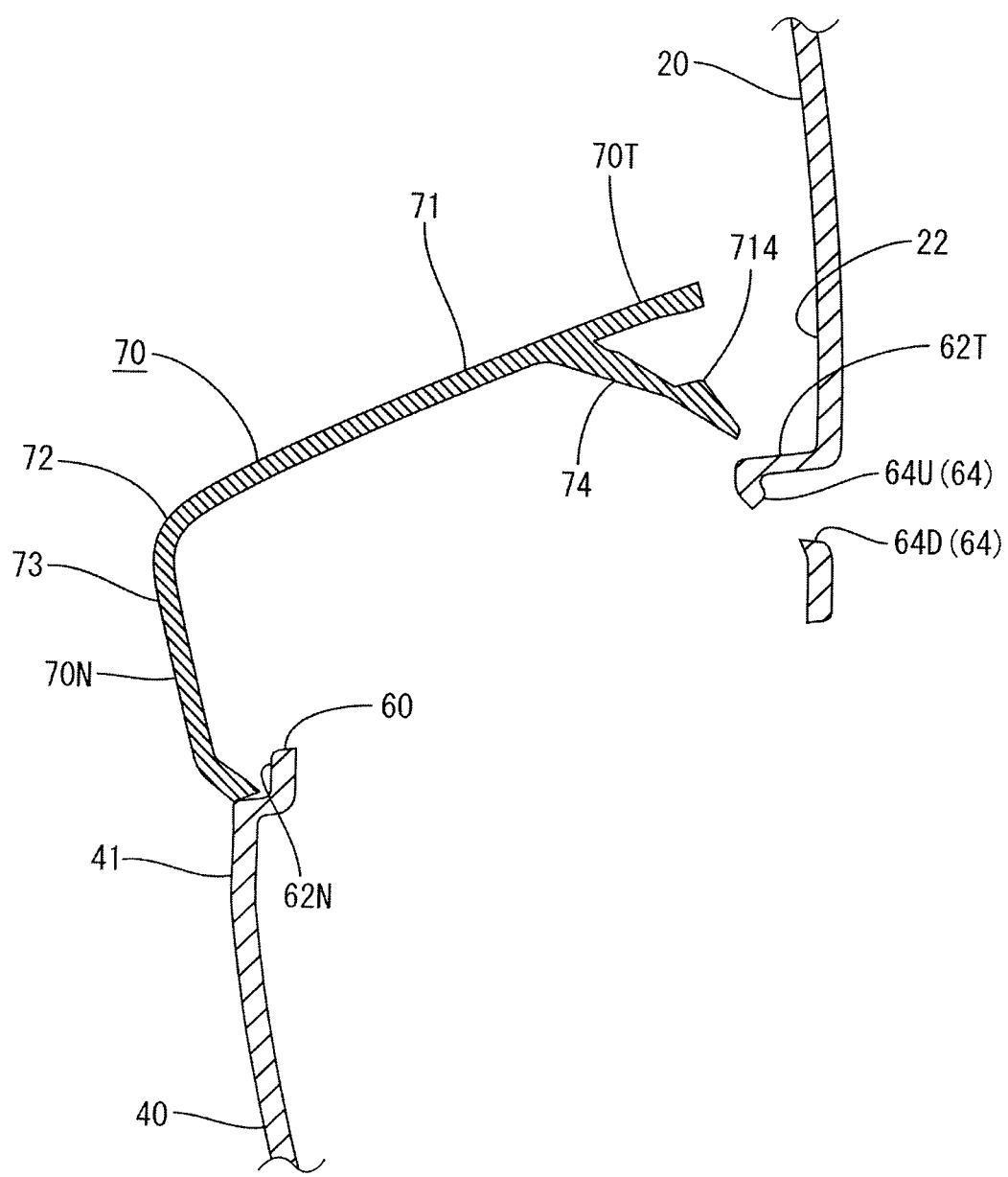
FIG. 9 is a cross-sectional view illustrating a part of the exterior stopper projection fixing in FIG. 8 where an exterior stopper projection is released.

Accordingly, the vehicular exterior hole edge portion 62T having the external stopper holes 64 therein is pushed and moved toward the vehicular exterior side, and the stopping of the external stopper projections 74 in the external stopper holes 64 (the stopping of the stopper portions 714) is released, as illustrated in FIG. 9. The external stopper holes 64 are near the bridge portion 90 that transfers the impact force to the vehicular exterior hole edge portion 62T and therefore, the vehicular exterior hole edge portion 62T and the lower edge portion 22 are likely to be warped and the external stopper projections 74 are likely to be released.

Accordingly, the vehicular exterior edge portion 70T of the armrest 70 is separated from the vehicular exterior hole edge portion 62T. The vehicular interior edge portion 70N of the armrest 70 is fixed to the vehicular interior hole edge portion 62N with the screws 80 in the irreversible way. With such a fixing method, the vehicular interior edge portion 70N is less likely to be separated from the vehicular interior hole edge portion 62N according to the application of impact relatively compared to the vehicular exterior edge portion 70T. According to such a configuration, according to the application of impact, the armrest 70 is moved such that only the vehicular exterior edge portion 70T side is moved upward with the vehicular interior edge portion 70N being a support point or a rotation axis.

As described before, the armrest 70 is mounted on the interior part component (60, 62) from the above and includes the vehicular interior edge portion 70N and the vehicular exterior edge portion 70T. One (70T) of the vehicular edge portions is mounted on the interior part component (60, 62) so as to be removed from the interior part component (60, 62) more easily relatively compared to another one (70N) of the vehicular edge portions. According to such a configuration, if the impact load is applied to the armrest 70 in the vehicular interior-exterior direction in case of a side collision, the one vehicular edge portion (70T) is released from the interior part component (60, 62) and the one side portion (the one vehicular edge portion 70T) of the armrest 70 with respect to the vehicular interior-exterior direction is lifted upward.

Among the vehicular interior edge portion 70N and the vehicular exterior edge portion 70T of the armrest 70, the vehicular interior edge portion 70N (another edge portion) that is relatively less likely to be removed from the hole edge 62 functions as a support point or an axis and the one edge portion (70T) is moved upward or rotated around the support point or the axis. Thus, the one edge portion (70T) is free from the stopping of the external stopper projections 74 in the external stopper holes 64. Accordingly, in case of a side collision, the impact load is released on the free end side and other edge portion of the armrest 70 is fixed. Therefore, the armrest 70 is less likely to be completely separated from the interior part component (60, 62) and fly away within the vehicle.

In case of a side collision, the occupant's hip is first in contact with the interior part component (40, 60) that is below the armrest 70 and subsequently the occupant's stomach area is in contact with the vicinity of the armrest 70. The armrest 70 is lifted upward to be rotated as described above by the impact caused by the prior contact with the hip and therefore, the subsequent impact received by the stomach area is reduced. The armrest 70 requires rigidity because the occupant puts his/her arm on the armrest 70. For example, in a configuration that the armrest 70 is bent to absorb impact and protect the occupant, a part (a bent portion) of the armrest 70 is necessarily has low rigidity. In the vehicular interior part 1 according to the present embodiment, the armrest 70 does not include a weak portion and has a sufficient plate thickness to provide good quality.

In case of a side collision, among the vehicular interior edge portion 70N and the vehicular exterior edge portion 70T of the armrest 70, one edge portion that is mounted in the irreversible way functions as a support point or an axis and only one edge portion that is mounted in the reversible way is released.

If the vehicular interior edge portion 70N corresponds to the other one of the vehicular edge portions, in case of a side collision, the vehicular exterior edge portion 70T is moved upward with the vehicular interior edge portion 70N being a support point (fixed). The armrest 70 is rotated around the vehicular interior edge portion 70N, which is a rotation axis, and the vehicular exterior edge portion 70T is moved upward. Therefore, the back surface of the armrest 70 where the mounting parts are disposed faces the vehicular exterior side and the occupant is surely protected.

In case of a side collision, if the occupant's hip is first in contact with the interior part component 40, 60 that is disposed below the armrest 70, the impact load is applied to the vicinity of the vehicular interior hole edge portion 62N of the armrest mounting hole 60 and the impact load is transferred via the bride portion 90 to the vehicular exterior hole edge portion 62T. Accordingly, the vehicular exterior hole edge portion 62T is warped and the vehicular exterior edge portion 70T of the armrest 70 is more surely released from the hole edge 62.

The vehicular exterior edge portion 70T of the armrest 70 is mounted on the vehicular exterior hole edge portion 62T near the bridge portion 90. Therefore, if the impact force transferred from the vehicular interior hole edge portion 62N through the bridge portion 90, the vehicular exterior hole edge portion 62T is likely to be warped as is closer to the bridge portion 90. Therefore, the portion of the vehicular exterior edge portion 70T near the bridge portion 90 is released from the hole edge portion quite easily. Therefore, the vehicular exterior edge portion 70T side of the armrest 70 is removed from the hole edge portion more surely.

Other Embodiments

The present technology is not limited to the description as described above with reference to the drawings. For example, the present technology may include following embodiments.

(1) In the above embodiment, the vehicular interior edge portion 70N of the armrest 70 is fixed with the screws 80 (irreversible mounting method, fixing with fastening) and the vehicular exterior edge portion 70T of the armrest 70 is mounted with the external stopper projections 74 (reversible mounting method, fixing with stoppers). However, the vehicular interior edge portion may be mounted with stopper portions and the vehicular exterior edge portion may be mounted with screw fixing if it is difficult to mount the vehicular interior edge portion with screw fixing due to a shape of the upper edge portion of the lower board or a shape of the armrest in terms of design of the door trim. If the vehicular interior edge portion is mounted with stopper portions, the stopper projections on the vehicular interior side can be released only by the impact load applied on the upper edge portion of the lower board 40. Therefore, the bridge portion is not necessarily included on the hole edge 62.

(2) In the above embodiment, the fixing portions with the screws 80 on the vehicular interior hole edge portion 62N are the vehicular front edge portion 62F and the vehicular rear edge portion 62R. However, the fixing portions with the screws 80 are not necessarily included at both edge portions of the hole edge 62 but may be on inner side than the both edge portions and may be on the vehicular interior side or the vehicular exterior side.

The invention claimed is:

1. A vehicular interior part comprising:
an armrest extending in a vehicular front-rear direction, the armrest including a vehicular interior edge portion and a vehicular exterior edge portion; and
an interior part component in which the armrest is mounted from an upper side at at least the vehicular interior edge portion and the vehicular exterior edge portion, wherein
the vehicular exterior edge portion is mounted on the interior part component so as to be removed from the interior part component relatively more easily the vehicular interior edge portion, wherein
the interior part component includes a board member having an armrest mounting hole that is through the board member in a vehicular upper-lower direction and having a hole edge mounting portion on which the armrest is mounted from the upper side, the hole edge mounting portion includes a vehicular interior hole edge mounting portion and a vehicular exterior hole edge mounting portion, and
the interior part component further includes a bridge portion that extends from the vehicular interior hole edge mounting portion to the vehicular exterior hole edge mounting portion.

2. The vehicular interior part according to claim 1, wherein the vehicular exterior edge portion of the armrest is mounted on the vehicular exterior hole edge mounting portion near the bridge portion.

3. The vehicular interior part according to claim 1, wherein
the vehicular exterior edge portion is reversibly mounted on the interior part component and the vehicular interior edge portion is irreversibly mounted on the interior part component.

4. A vehicular interior part comprising:
an armrest extending in a vehicular front-rear direction, the armrest including a vehicular interior edge portion and a vehicular exterior edge portion; and
an interior part component in which the armrest is mounted from an upper side at at least the vehicular interior edge portion and the vehicular exterior edge portion, wherein
the vehicular exterior edge portion is mounted on the interior part component so as to be removed from the interior part component relatively more easily than the vehicular interior edge portion, wherein
the interior part component includes a board member having an armrest mounting hole that is through the board member in a vehicular upper-lower direction and having a hole edge mounting portion on which the armrest is mounted from the upper side, the hole edge mounting portion includes a vehicular interior hole edge mounting portion and a vehicular exterior hole edge mounting portion,
the vehicular exterior hole edge mounting portion has exterior stopper holes that are through the vehicular exterior hole edge mounting portion and has hole edges of the exterior stopper holes,
the armrest includes exterior stopper projections projecting downward from a portion thereof near the vehicular exterior edge portion,
the exterior stopper projections are fit in the exterior stopper holes and stopped by the hole edges of the exterior stopper holes, and
the vehicular interior edge portion of the armrest is fixed to the interior part component at at least two portions thereof.

5. The vehicular interior part according to claim 4, wherein the exterior stopper projections are removable from the exterior stopper holes by application of external force.

6. The vehicular interior part according to claim 5, wherein
the armrest is moved by the application of external force such that the exterior stopper projections are removed from the exterior stopper holes and moved upward with the vehicular interior edge portion being fixed to the interior part component.

7. The vehicular interior part according to claim 4, wherein the vehicular exterior edge portion is reversibly mounted on the interior part component and the vehicular interior edge portion is irreversibly mounted on the interior part component.

\* \* \* \* \*